US008712628B1

(12) United States Patent
Hart

(10) Patent No.: US 8,712,628 B1
(45) Date of Patent: Apr. 29, 2014

(54) VEHICLE AND COMMUNICATION MONITORING

(76) Inventor: Paul Hart, Dyersburg, TN (US)

( * ) Notice: Subject to any disclaimer, the term of this patent is extended or adjusted under 35 U.S.C. 154(b) by 28 days.

(21) Appl. No.: 13/248,685

(22) Filed: Sep. 29, 2011

(51) Int. Cl.
*G07C 5/00* (2006.01)

(52) U.S. Cl.
USPC .............................................. 701/29.1; 701/1

(58) Field of Classification Search
USPC ................ 701/1, 29.1, 31.4, 31.5, 31.7, 31.8,
701/32.3, 32.4, 32.7, 33.2, 33.4, 34.4, 36;
340/904, 438
See application file for complete search history.

(56) References Cited

U.S. PATENT DOCUMENTS

| | | | |
|---|---|---|---|
| 7,363,149 B2 * | 4/2008 | Klausner et al. | 701/32.7 |
| 7,548,491 B2 | 6/2009 | Macfarlane | |
| 2003/0204290 A1 | 10/2003 | Sadler et al. | |
| 2006/0066149 A1 | 3/2006 | Holloway et al. | |
| 2006/0123462 A1 * | 6/2006 | Lunt et al. | 726/1 |
| 2007/0046425 A1 | 3/2007 | Booth | |
| 2007/0143482 A1 | 6/2007 | Zancho | |
| 2008/0093445 A1 | 4/2008 | Greaves | |
| 2008/0312786 A1 * | 12/2008 | Day | 701/33 |
| 2011/0009107 A1 * | 1/2011 | Guba et al. | 455/418 |

OTHER PUBLICATIONS

Bacheldor, Beth. "USPS Uses RFID to Manage Vehicles, Drivers," RFID Journal. Jul. 10, 2006. 2 pages.
'RMTracking' GPS Tracking for Vehicle Tracking. [online] [retrieved on Aug. 12, 2011]. Retrieved from internet electronic mail: http://web.archive.org/web/20090416021731/http://www.rmtracking.com/ Apr. 16, 2009, 1 page.
'Live View GPS' Live Trac PT-10. [online] [retrieved on Aug. 12, 2011]. Retrieved from internet electronic mail: http://www.liveviewgps.com/live+trac+pt-10+.html 3 pages.
'Tiwi: drive aware' Fact Sheet. Jun. 4, 2008. 2 pages.

* cited by examiner

*Primary Examiner* — Mary Cheung
*Assistant Examiner* — Rodney Butler
(74) *Attorney, Agent, or Firm* — Fish & Richardson P.C.

(57) ABSTRACT

Methods, systems and apparatus for vehicle and communication monitoring. In an aspect, a vehicle device comprising a processing subsystem, a communication subsystem that communicates over a wireless medium, and a memory subsystem that stores processing instructions that are executable by the processing subsystem and upon such execution cause the vehicle device to perform operations comprising: determining an operational status of a vehicle in which the vehicle device is located; receiving, from a communication device, operating data describing an operation being performed by the communication device; accessing usage policy data that describes a usage policy of the communication device during vehicle operation; and in response to determining, based on the operational status of the vehicle and the operation being performed by the communication device, that a usage policy violation has occurred, generating policy violation data describing the usage policy violation.

17 Claims, 4 Drawing Sheets

VEHICLE AND COMMUNICATION MONITORING

This disclosure relates to monitoring the operation of an automotive vehicle.

BACKGROUND

Owners of fleet vehicles (e.g., a utility company with a fleet of service vehicles), or employers that employ persons to perform employment responsibilities while using their personal vehicles (e.g., a pizza delivery service for which delivery personnel use their own vehicles), desire that drivers of the vehicles operate the vehicles in a responsible and safe manner. For example, employers want to ensure that each employee is driving responsibly and obeying the traffic laws of their jurisdiction when driving during the performance of the employee's responsibilities.

Furthermore, many jurisdictions have enacted, or are in the process of enacting, various "distracted driving" laws. For example, in many jurisdictions it is illegal to manually text (i.e., enter text data by use of a keyboard), manually place or receive a telephone call, manually compose e-mail, or manually read e-mail on mobile communication devices while driving.

Systems that facilitate monitoring vehicle operation, however, often report data that does not account for whether the driver of the vehicle is violating a policy that conforms to local distracted driving laws and/or an employer's rules for operating communication devices while driving (e.g., an employer's driving policy requires that drivers only use communication devices in "hands free" mode while drive, or not at all while driving).

SUMMARY

In general, one aspect of the subject matter described in this specification can be embodied in a system that includes a vehicle device comprising a processing subsystem, a communication subsystem that communicates over a wireless medium, and a memory subsystem that stores processing instructions that are executable by the processing subsystem and upon such execution cause the vehicle device to perform operations comprising: determining an operational status of a vehicle in which the vehicle device is located; receiving, from a communication device, operating data describing an operation being performed by the communication device; accessing usage policy data that describes a usage policy of the communication device during vehicle operation; and in response to determining, based on the operational status of the vehicle and the operation begin performed by the communication device, that a usage policy violation has occurred, generating policy violation data describing the usage policy violation. Other embodiments of this aspect include corresponding methods, apparatus, and computer program products.

Particular embodiments of the subject matter described in this specification can be implemented to realize one or more of the following advantages. Communication violation reports are provided in the context of a map indicating a current location of a monitored vehicle, providing the administrator with an "at-a-glance" view of the current vehicle location and a listing of communication violations, thus facilitating an assessment by the administrator.

The violations can be listed in the form of selectable dialogs, the selection of which provides detailed information regarding the violation, which can further facilitate a quick assessment by the administrator.

In implementations in which the monitoring system utilizes a separate vehicle device and a software agent installed on a driver's communication device, the violations can also be listed with a voice prompt, the selection of which establishes a voice communication with the vehicle device monitoring the vehicle, which further facilitates a quick assessment by the administrator.

The voice prompt can also include additional contact information of the driver, thus allowing the administrator to contact the driver by alternative means if the drive does not respond to the voice communication established over the vehicle device.

The software agent installed on the driver's communication device is, in some implementations, only active during the driver's shift, thus ensuring that the driver's communication device is not monitored at other times so as to protect the employee's privacy. In implementations in which the monitoring system utilizes a separate vehicle device and a software agent installed on a driver's communication device, the software agent only reports monitored data when the communication device is within a personal area network distance (e.g., 3 meters) of the vehicle device. Thus, should the employee be on a lunch break in a restaurant and make a personal call, operating data describing the call is not reported. This limited range of monitoring provides an additional layer of privacy protection.

In some implementations, operating data is anonymized to remove personally identifiable information (PII) and addressing information (e.g., telephone number, e-mail address, PIN numbers) describing an operation of a mobile communication device. For example, the operating data will describe that a telephone call was made, but not the number that was called; or that an e-mail message was composed and sent, but the e-mail content (e-mail address, subject, body, etc.) will not be described. The anonymization provides yet another layer of privacy protection for the employee.

Finally, in some implementations, only data describing violations of a usage policy are recorded. Data describing usage of a communication device that is in compliance with a usage policy are not recorded (e.g., usage data is not recorded when an employee is making a phone call while the vehicle is parked in a parking lot and remains parked for the duration of the telephone call). Compliance with local distracted driving regulations can thus be be easily tracked and ensured in a manner that protects both the employer's interest in making sure its drivers operate vehicles in a safe and responsible manner, and the employees interest in privacy.

The example advantages described above are optional advantages, and need not be realized in any particular implementation of the subject matter described in this specification. The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
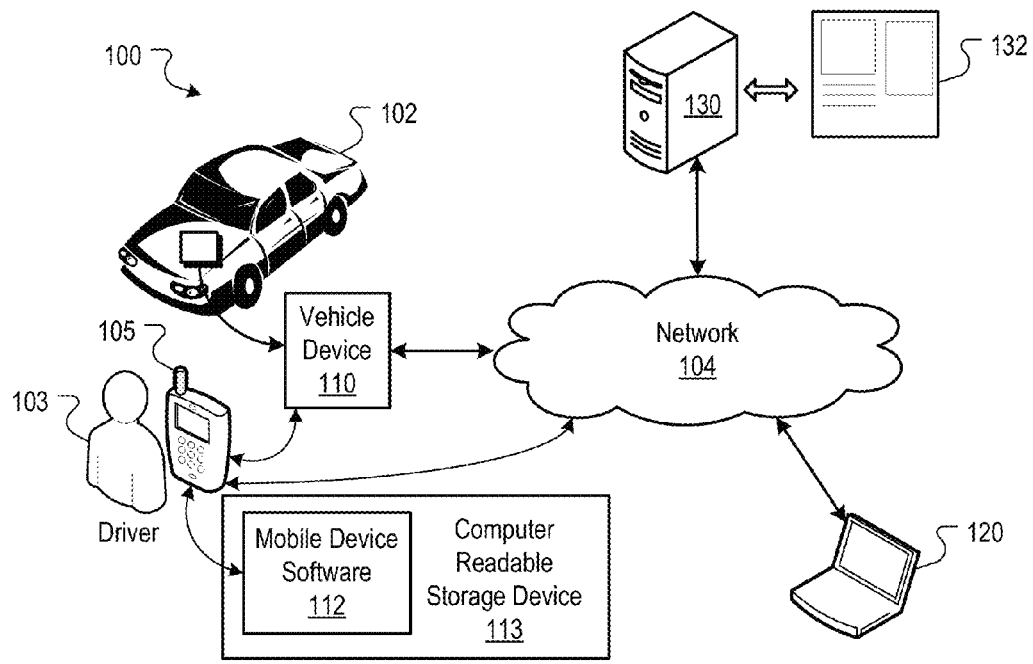
FIG. 1 is a block diagram of an example environment in which vehicle and communication monitoring data is recorded, analyzed and reported.

FIG. 1 is a block diagram of an example environment 100 in which vehicle and communication monitoring data is recorded, analyzed and reported. In some implementations, a vehicle 102 is fitted with a vehicle device 110 that can monitor vehicle parameters that describe the current operation of the vehicle. The vehicle device 110 is described in more detail in FIG. 2.

The vehicle device 110 can communicate over a network 104, such as a 3G or 4G network, a GSM network, or other types of wireless communication networks. The network 104 may also include other networks that are connected by gateways, such as the Internet.

A driver 103 of the vehicle 102 has a mobile communication device 105, which is capable of sending and receiving communication data, such as text, e-mails, and voice data over the network 104. The mobile device 105 has mobile device software 112 installed therein. The mobile device software 112 may be stored on a computer readable storage device 113 and provided to the mobile device for installation. The software is operable to generate and transmit operating data describing an operation being performed by the mobile communication device 105. For example, if a user is typing an e-mail, the software 112 generates and transmits operating data describing that the user is typing an e-mail. Likewise, if the user places a phone call and engages in a telephone conversation, the software 112 generates and transmits operating data describing the placement of a phone call and the ensuing telephone conversation.

In some implementations, the mobile device 105 includes a communication system that can transmit and receive data over two different protocols. For example, the device 105 may be capable of transmitting voice and data over a 4G network (e.g., a cellular network protocol), and transmit the operating data is transmitted over a Bluetooth network (e.g., a personal area network). The operating data describes the operating being performed over the 4G network (e.g., a voice call, sending an e-mail, etc.).

As will be described in more detail below, the vehicle device 110 can generate violation reports and send the violation reports to an administrator device by a wireless communication. For example, in some implementations, the vehicle device 110 can send a short messaging service (SMS) message to a server 130. The server 130 is equipped with software that can process the message and generate reporting data that illustrates the current location of the vehicle 102 and also describes the violation. For example, the server 130 generates a web page 132 that includes a map that illustrates the current location of the vehicle 102 and also describes the violation, and provides the web page to an electronic device, such as a personal computer 120 that is associated with the employer of the driver 103 (e.g., a risk assessment administrator).

In some implementations, a vehicle device 110 is used in conjunction with the mobile device software 112. The vehicle device 110 and the mobile device software 112 are, for example, provided by the employer. For example, if the vehicle 102 is a fleet vehicle, the device 110 is installed by the employer. Conversely, if the vehicle 102 is owned by the employee/driver 103, the device 110 is installed at the beginning of the driver's 103 shift and removed at the end of the shift. Operation of the device 110 and the software 112 in conjunction with the server 130 are described in more detail below.

Figure 2:
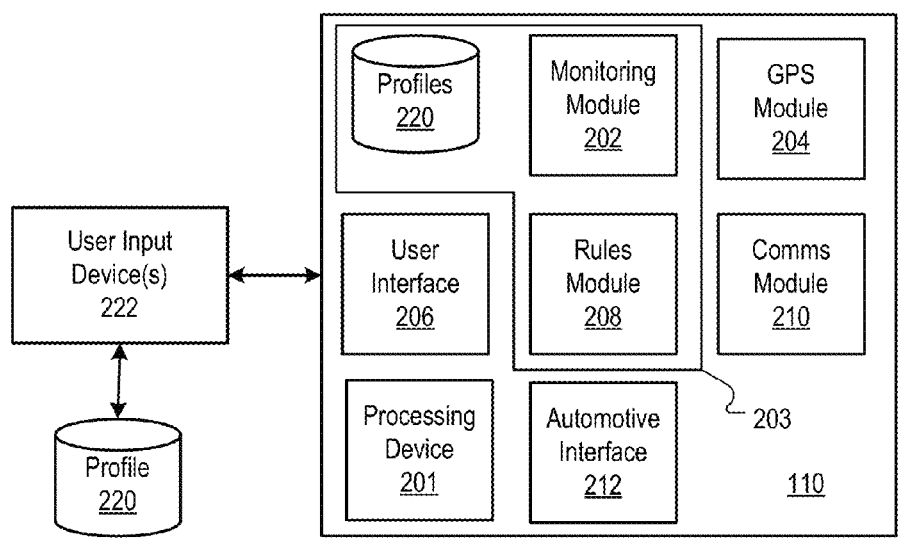
FIG. 2 is a block diagram of a vehicle device and a user input device.

FIG. 2 is a block diagram 200 of a vehicle device 110 and a user input device 222. The example vehicle device 110 is packaged so that it may be easily mounted in the vehicle 102, e.g., beneath the dashboard, inline with the ignition, etc. The device 110 includes a monitoring module 202, a global positioning system (GPS) module 204, a user interface 206, a rule module 208, a communication (comms) module 210, and an optional automotive interface 212.

The monitoring module 202 and rules module 208 can be implemented in software on a processing device 201, such as a microprocessor, application specific integrated circuit (ASIC), etc. The GPS module 204 may include GPS processing circuit and be in data communication with GPS satellites to determine latitude and longitude coordinates, or, alternatively, may be a communication interface that communicates with a separate GPS system. By use of the GPS module, the vehicle device 110 can obtain vehicle parameters such as location and current speed.

If so equipped with an automotive interface 212, the device 110 uses the automotive interface 212 to communicate with a vehicle control system. In some implementations, the automotive interface communicates with one or more on-board vehicle computers that communicate over the Controller Area Network (CAN) bus, and receives and transmits data over the CAN bus according to the CAN message frames. By use of the automotive interface 212, the vehicle device 110 can obtain vehicle parameters such as current speed, seat belt status, engine status, and other data that are communicated over the CAN bus in message frames.

A memory device 203 stores instructions that are executable by the processing device, e.g., instructions that define the monitoring module 202 and rules module 208. The memory device 203 also stores profiles 220. The profiles include user profiles and an administrator profile. Each user profile specifies profile parameters for the user profile, and each profile parameter defines operational limits for an automotive vehicle for that user. Example operational limits are maximum speed, driving area, maximum range, and the like. The user profile can also include other data, such as the user's name, a user's phone number, and whether one or more security tests to be applied and the conditions under which the tests are to be applied. The user profile is maintained by the administrator.

The administrator profile stores contact information wirelessly providing data to an administrator device associated with the administrator. For example, if the administrator elects to receive SMS messages, the contact information is an SMS number. Likewise, if the administrator elects to receive e-mail messages or instant message notifications, the contact information includes such addressing information. Thus the vehicle device 110, by use of the communication module 210, can contact the administrator device using the contact information.

The user interface 206, in some implementations, can include a keypad by which the user can enter a user identifier, such as a four digit personal identification number, that identifies the user, and which, in turn, identifies the profile 220 associated with the user. Data describing the user's historical driving performance is associated with the user identifier and stored in the profiles 220.

Figure 3:
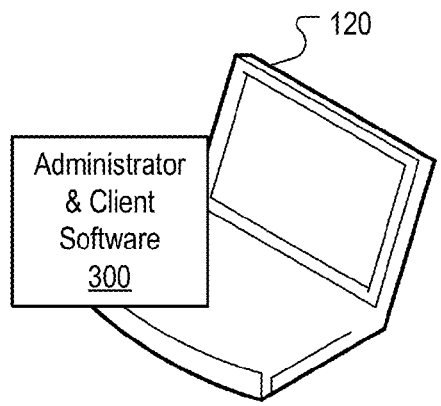
FIG. 3 is a block diagram of a personal computer equipped with administrator and client software for viewing and processing reports.

FIG. 3 is a block diagram of a personal computer 120 equipped with administrator and client software 300 for the vehicle device 110. The administrator and client software 300 provides a user interface by which an administrator can configure and manage the vehicle device 110. In some implementations, the vehicle device 110, by use of the user interface 206, can mate with a USB interface device 302 that can be connected to the computer 120, e.g., the device 110 is removed from the vehicle (or a laptop is brought to the vehicle) and a wired connection is established. Alternatively, the server system 130, in data communication with the personal computer 120 and the network 102, can establish a session between the device 110 and the personal computer 120 so that updates and management can be accomplished by wireless means. The administrator can then access the vehicle device 110 in an administrative mode (e.g., by inputting an administrative PIN number), and upload the configuration data to the vehicle device 110 to configure the vehicle device 110, and upload stored data stored in the profiles 220.

The administrator, by use of the software 300, can configure multiple user profile and specify specific profile parameters for each user profile. For example, if the administrator employs multiple drivers in a pizza delivery service, the administrator may program in the shift information for each driver. Thus, if a driver forgets to enter his or her PIN number at the beginning of the shift, the driver's actions will still be associated with his or her profile, as the device 110 will determine the identity of the driver according to the shift schedule.

The rules module 208 includes usage policy data that describes a usage policy of the communication device 105. The usage policy is determined by the employer. For example, assume a jurisdiction has enacted distracted driving laws that allow for only the "hands free" use of mobile devices while operating a vehicle, and the employer has decided that all employees must comply with the distracted driving laws. Accordingly, the usage policy data will include logic that defines a policy of only "hand free" use during vehicle operation. By way of another example, assume a jurisdiction does not have distracted driving laws in force, but that the employer has decided that all employees may only send or receive calls by "hands free" operation when operating a vehicle during the employee's shift. The usage policy data will include logic that defines a policy of only "hands free" placement and receiving of calls during vehicle operation.

During vehicle operation, the mobile device software 112 generates operating data describing an operation being performed by the communication device 105, and transmits the operating data to the vehicle device 110. For example, if the user 103 places a phone call 105 (either by hands free or by manually dialing the number), the mobile device software 112 transmits operating data that describes the placement of the phone call and the method used to place the call. The vehicle device 110, by use of the monitoring module 202 and the rules module 208, determines the operational status of the vehicle 102 and accesses the usage policy data to determine whether the operation being performed by the communication device is in violation of the usage policy data.

For example, if the call is placed by a hands free method, and the usage policy allows for placement of calls by the hands free method, then the vehicle device 110 determines that no policy violation has occurred. Conversely, if the call is placed manually while the vehicle is in motion, then the vehicle device 110 determines that a usage policy violation has occurred and generates policy violation data describing the usage policy violation.

In some implementations, data describing the violation is stored in the profile data 220 and associated with the user identifier of the driver 103. Additionally, the vehicle device 110 can also wirelessly send a violation report to the administrator device by use of the communication module 210. In some implementations, the violation report is sent to the administrator device by an SMS message to the administrator device. The SMS message includes, for example, a vehicle identifier, a profile identifier, the date and time, the operating data (e.g., manual placement of call, typing text while driving, etc.), and location data that specifies the location of the vehicle in which the vehicle device 110 is installed. The administrator device, upon receiving the violation report, can present a user interface in which the violation data are graphically represented, and through which one or more options may be taken by the administrator.

Figure 4A:
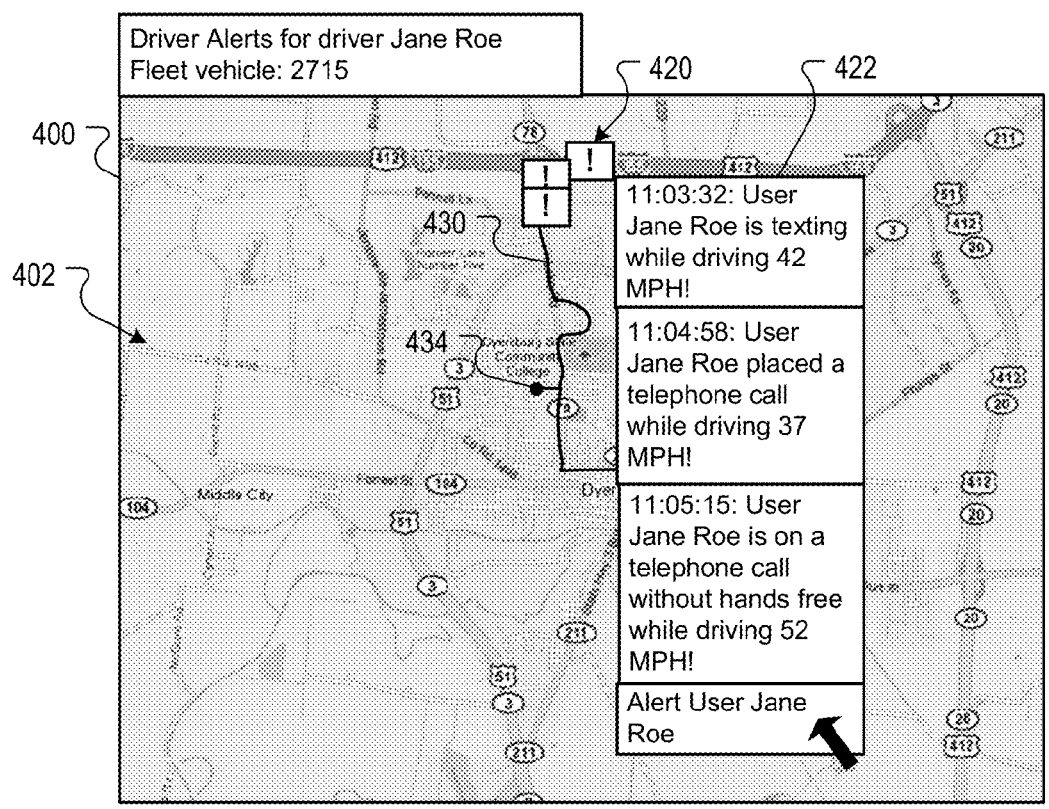
FIGS. 4A and 4B are illustrations of an example user interface for a violation report.
Figures 4B, 5:
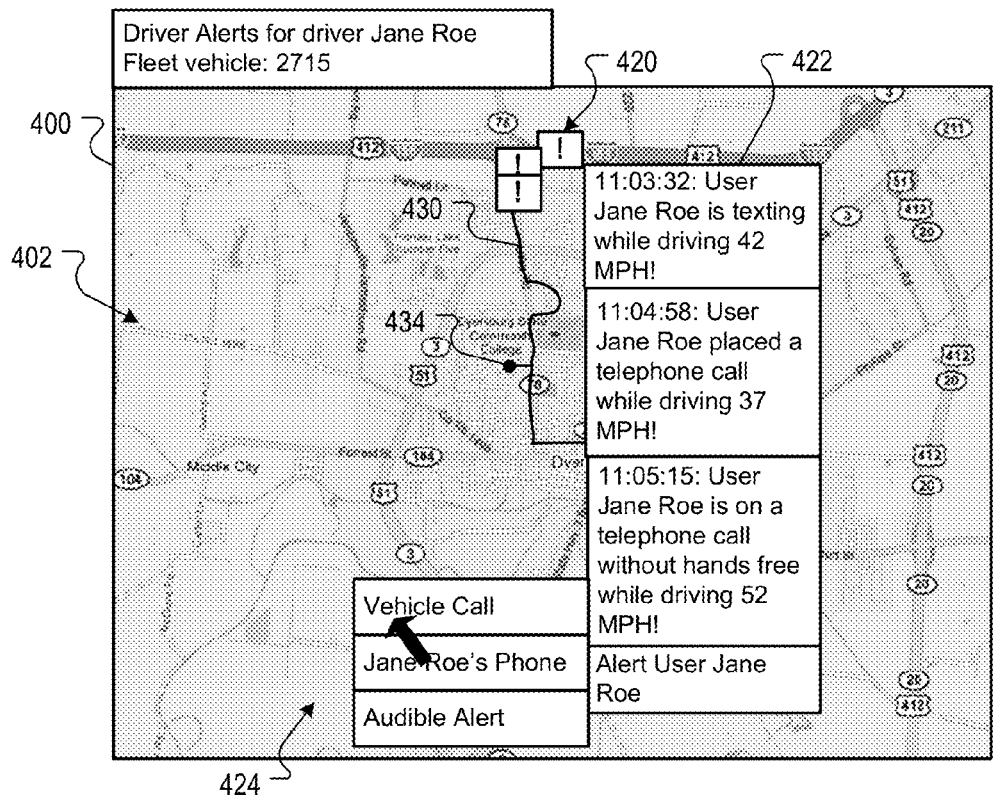
FIG. 5 is an illustration of an example user interface for a driver report.

FIGS. 4A and 4B are illustrations of an example user interface for a violation report. The user interface 400 can, for example, be generated the personal computer 120. In some implementations, the client software 310 is configured to generate the user interface 400 in response computer 120 receiving violation report data from the server 130.

In some implementations, the client software 300 causes the computer 120 to retrieve the location data (e.g., latitude and longitude data) from the violation report data, and renders a map 402 on a display device. The map includes the location specified by the latitude and longitude coordinates. In some implementations, the map data are stored on the device 120. In other implementations, the device 120, using the client software 300, contacts a publicly accessible map server to request the corresponding map data to render the map.

The device 120 then renders icon(s) 420 identifying the location of the vehicle when a violation occurred, and also renders a message(s) 422 that describes the operation being performed by the communication device 105 that cause the device 110 to determine a violation of the usage policy occurred. As shown in FIG. 4A, the driver, Jane Roe, is operating the vehicle and mobile communication device 105 in such a manner three violations have occurred. The first violation occurred when the driver texted while driving; the second occurred when the driver placed a phone call while driving; and the third occurred when the driver engaged in a phone conversation while driving.

Included in the message(s) 422 is an alert command to generate an alert (e.g., a voice call, or an audible alert) to the driver. Selection of the alter causes the contextual menu 424 to be shown as illustrated in FIG. 4B. Two voice calls are available—the first for a "hands free" call to the vehicle device 110, which is configured to answer automatically, and the second to the driver's mobile device 105 that is being used in connection with the violations of the usage policy. The voice call initiation prompt is selectable, and upon such selection causes the administrator device 122 to place a call to the selected communication device. The vehicle device 102 has a speaker phone capability, and can automatically answer an incoming call from the administrator device 122, thereby establishing a communication between the drive and the administrator almost in real time with the occurrence of a violation.

Another option is to generate an audible alert by means of the vehicle device 110. For example, upon selection of the "Audible Alert" option, the vehicle device will emit an audible tone indicating an administrator is aware of the violation. In variations of this implementation, the vehicle device 110 can be configured to automatically generate an audible alert whenever a usage policy violation is detected to notify the driver that he or she is in violation of the employer's vehicle policies.

Additional data can also be shown in the user interface 400. For example, by use of one or more SMS messages, a user's driving history can be indicated by a path 430. Significant events, such as where the user started and stops of long durations, e.g., longer than five minutes, can be indicated by respective event icons 432 and 434, respectively. Selection of an event icon 432 and 434 or a portion of the path 430 can provide additional details regarding the vehicle performance parameters at that point in the path, e.g., speed, time, etc.

In some implementations, the SMS messages that provide the path data are formatted in a path format. One example path format is a series of times stamps and latitude and longitude coordinates. Multiple time stamps and coordinates can be provided in a single SMS message, and the vehicle device 102 can provide the path data in response to a request from the administrator device 122. In some implementations, the vehicle device 102 can send path data that describes the entire path taken by a particular user over a time period, e.g., the most recent six hours. In other implementations, the vehicle device 102 can send a predefined number of SMS messages, e.g., three, that include the most recent path data. The administrator may then request additional path data by use of the device 122 to receive the next most recent set of path data, e.g., another three SMS messages that include path data.

In some implementations, the administrator can query the vehicle device 102 for a vehicle status, and can receive the current speed, location, and other vehicle parameters associated with the current operation of the vehicle. If the vehicle device is in data communication with the CAN bus, additional vehicle parameters obtained from the CAN bus, e.g., seat belt status, etc., can also be provided.

As described above, in some implementations, many of the client features described above can also be realized by a cloud-based service provided by a vehicle monitoring server 130. The cloud based service is typically used by enterprises or other entities or persons that desire to ensure compliance by a large number of drivers.

FIG. 5 is an illustration of an example user interface 500 for a driver report. The report shown is for mobile device usage policy violations. The data that is used to generate the report can, for example, be data received from communications from the vehicle device 110 to the server 130 and that is processed and stored at the server on an employer basis. When an employer logs into the server with the employer's identifier, the violation reports for the employer's drivers are made available to the employer. Alternatively, the data can be obtained by directly downloading the data from the vehicle device 110 by means of an interface, such as a USB cable.

The report includes a parameter section 502 that identifies the driver, provides time frame selections, dates, shift information, and a vehicle identifier. As shown in FIG. 5, a "Daily Report" option has been selected, as indicated by the italicized font, and thus the report is for a daily period. The period shown is for Aug. 2, 2011, and the shift is from 9:00 AM-6:00 PM.

A data table 502 lists all violations that occurred during the selected reporting period. For example, the violations that are listed are for violations that occurred on Aug. 2, 2011. Each violation includes a time, a location (e.g., location data, such as lat/long coordinates, or other data that can be used to locate a position), a driving speed, a violation code, a duration, and a violation reference.

The violation codes are predefined codes that identify the action that, coupled with the driving of the vehicle, constitutes a violations. For example, Txt-Snd corresponds to a text message being sent; Cll-Snd correspond to the sending of a telephone call; Cll-Act corresponds to an active telephone call; Eml-Com corresponds to the composing (typing) of an e-mail, and Eml-Snd correspond to the sending of an e-mail.

The duration indicates the time spent performing the action that constituted the violation. For example, the driver spent 45 seconds sending the text message; four seconds placing the call; 37 seconds engaged in a telephone conversation, etc.

In some implementations in which the data are anonymized, the report can include a violation reference. Because the operating data are anonymized, telephone numbers, e-mail addresses and the like are not included in the operating data. However, the device software 112 can be configured to generate a violation reference that can be used to link related violations. For example, the first three violations have the same violation reference of 10343, which indicates the text message and the phone call were to the same telephone number. In some implementations, the violation reference can be determined from a hash of the addressing information, e.g., a hash of the phone number for SMS messages or phone calls; a hash of the e-mail address for e-mail messages; etc.

In other implementations, the violation reference data can be entirely omitted, so that only the actions that constituted the violations are reported.

Finally, actions that did not constitute a violation, e.g., placing a telephone call when the vehicle is parked, for example, are not reported to the employer.

Figure 6:
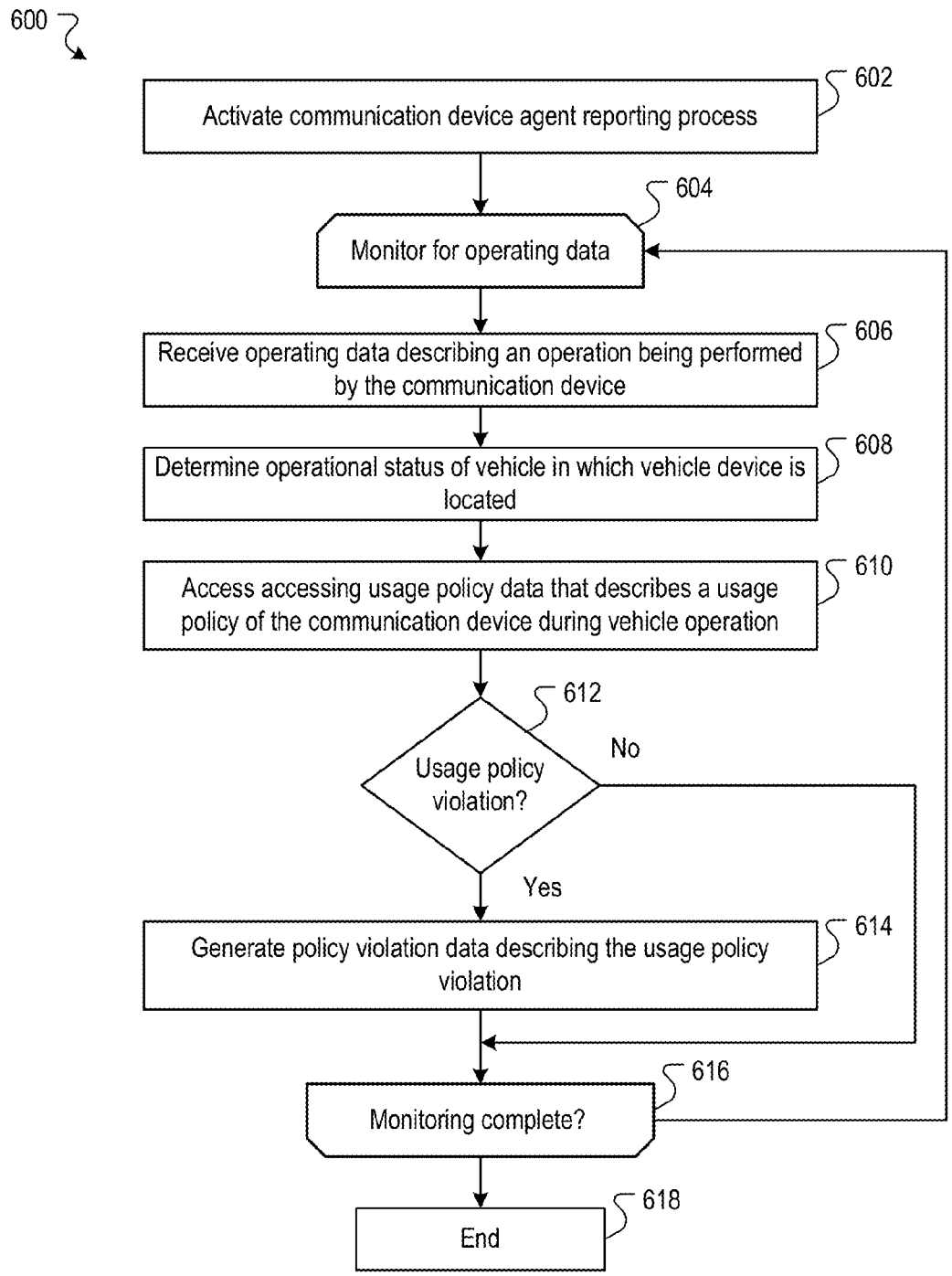
FIG. 6 is a flow diagram of an example process for monitoring communication device usage for policy violations while in operation of a vehicle.

FIG. 6 is a flow diagram of an example process 600 for monitoring communication device usage for policy violations while in operation of a vehicle.

The process 600 activates a communication device reporting process (602). For example, the mobile device software agent installed on the driver's communication device is activated and generating reporting data only during the driver's shift, thus ensuring that the driver's communication device is not monitored at other times so as to protect the employee's privacy. Furthermore, in some implementations, the software agent only reports monitored data when the communication device is within a personal are network distance (e.g., 3 meters) of the vehicle device. For example, the software agent may have a list of vehicle device identifiers (e.g., MAC addresses) with which it may communicate, and if the vehicle devices are not identified over a personal area network, the mobile device agent will not transmit the operating data. Thus, should the employee be on a lunch break in a restaurant and make a personal call, operating data describing the call is not reported and therefore cannot be received by other personal area network devices.

The process 600 begins a monitoring loop for operating data (604). For example, the vehicle device begins to monitor for operating data sent by the mobile device over a personal area network protocol.

The process 600 receives operating data describing an operation being performed by the communication device (606). For example, the device software 112, in response to the driver using (e.g., typing, playing a game, etc.) the device 105, generates operating data describing the operating being performed by the communication device (606). In some implementations, operating data is anonymized to remove personally identifiable information and addressing information (e.g., telephone number, e-mail address, PIN numbers) describing an operation of a mobile communication device. For example, the operating data will describe that a telephone call was made, but not the number that was called; or that an e-mail message was composed and sent, but the e-mail content (e-mail address, subject, body, etc.) will not be described.

The process 600 determines an operations status of the vehicle in which the vehicle device is located (606). For example, the vehicle device 110, using a GPS module 204, can determine whether the vehicle is in motion or stationary. Additionally, if the vehicle device 110 is in data communication with the vehicle 102 (e.g., by means of a CAN interface), the device 110 can determine additional operating characteristics, such as whether the vehicle is in park if the vehicle is stationary, etc.

The process 600 accesses usage policy data that describes a usage policy of the communication device during vehicle operation (610). For example, the monitoring module 202 accesses the rules module 208 to determine the usage policy specified by the employer, e.g., no mobile device operation while driving, or only hands free device operation allowed while driving, etc.

The process 600 determines, based on the operational status of the vehicle and the operation being performed by the communication device, whether a usage policy violation has occurred (614). If the process 600 determines that a policy violation has occurred, then the process 600 generates policy violation data describing the usage policy violation (614). For example, data for a row of violation data for the violation report of FIG. 5 may be generated. Additional steps, such as wirelessly sending the policy violation data to an administrator by use of the communication subsystem 210, and/or storing the policy violation data in the profiles data 220, of the memory subsystem, and/or generating a audible alert can be performed.

Conversely, if the process 600 determines that a policy violation has not occurred, then the process 600 ignores the data and determines if the monitoring is complete (616). The process may determine that monitoring is complete, for example, if the end of a shift occurs, or if the mobile device 105 is no longer in data communication with the vehicle device 110. If monitoring is not complete, the process 600 continues to monitor for operating data; otherwise, the process 600 ends.

In variations of the implementations described above, the processing capabilities of the vehicle device 110, sans the automotive interface 212, can be integrated into the mobile device software 112. In these implementations, the mobile device software 212 generates both the operating and violation reporting data only when the user is determined to be performing during a scheduled shift. For example, the software 112 may cause the mobile device 105 to receive schedule data from the server 130. The schedule data defines the shift of the user, and the software 112 will only monitor the user's actions during the scheduled shifts. By use of data received from a GPS unit within the mobile device 105, the software 112 can infer whether the vehicle is operating. In variations of this implementation, the software 112 defines a speed and location threshold to determine whether the user is operating the vehicle or within the vehicle. For example, a speed threshold may be 6 miles an hour; only if the GPS unit determines that that mobile device 105 moving in excess of 6 miles an hour will the software 112 determine that the user is operating the vehicle. For example, it is unlikely that the user would be running at 15 miles an hour while composing a text message. Likewise, only if the GPS unit determines that that mobile device 105 is within a predetermined distance of a road (e.g., 5 yards laterally and 5 years vertically) will the software 112 determine that the user is operating the vehicle. For example, it is unlikely that the user be operating the vehicle 200 feet above the elevation of a road (i.e., when the user is in the upper floor of an office building during a service call), or 20 yards from the nearest road (i.e., when the user is in the middle of a shopping mall during a service call or on a lunch break).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A vehicle control and monitoring system, comprising:
    a vehicle device comprising a processing subsystem, a communication subsystem that communicates over a wireless medium, and a memory subsystem that stores processing instructions that are executable by the processing subsystem and upon such execution cause the vehicle device to perform operations comprising:
        determining an operational status of a vehicle in which the vehicle device is located;
        receiving over a first wireless protocol, from a mobile communication device separate from the vehicle device, and wherein the mobile communication device communicates over the first wireless protocol and a second wireless protocol, operating data describing an operation being performed by the mobile communication device over the second wireless protocol;
        accessing usage policy data that describes a usage policy of the mobile communication device during vehicle operation; and
        in response to determining by the vehicle device, based on the operational status of the vehicle and the operation being performed by the mobile communication device, that a usage policy violation has occurred, generating, by the vehicle device, policy violation data describing the usage policy violation.

2. The system of claim 1, wherein the instruction cause the vehicle device to perform further operations comprising wirelessly sending the policy violation data to an administrator by use of the communication subsystem.

3. The system of claim 1, wherein the instruction cause the vehicle device to perform further operations comprising storing the policy violation data in the memory subsystem.

4. The system of claim 1, wherein the vehicle device includes a global positioning system module, and wherein the policy violation data include a location at where the usage policy violation occurred, and a time at which the usage policy violation occurred.

5. The system of claim 1, wherein:
    the communication subsystem receives the usage policy data according to the first wireless protocol from the mobile communication device.

6. The system of claim 5, wherein the first wireless protocol is a personal area network protocol, and the second wireless protocol is a cellular network protocol.

7. The system of claim 1, further comprising:
    mobile communication device agent software stored in a computer readable storage device and executable by the mobile communication device, wherein upon such execution the software causes the mobile communication device to perform operations comprising:
    for each communication operation performed by the mobile communication device over the second wireless protocol, generating the operating data describing the operation being performed by the mobile communication device over the second wireless protocol and transmitting the operation data to the vehicle device over the first wireless protocol.

8. The system of claim 7, wherein the first wireless protocol is a personal area network protocol, and the second wireless protocol is a cellular network protocol.

9. The system of claim, 8 wherein the generating the operating data describing the operation being performed by the mobile communication device over the second wireless protocol comprises anonmyzing the operation data so that personally identifiably information is excluded from the operating data.

10. A computer-implemented method, comprising:
    determining, by a vehicle device, an operational status of a vehicle;
    receiving, by the vehicle device and over a first wireless protocol and from a mobile communication device separate from the vehicle device, wherein the mobile communication device communicates over the first wireless protocol and a second wireless protocol, operating data describing an operation being performed by the mobile communication device over the second communication protocol, and wherein the mobile communication device is determined to be in use by an operator of the vehicle;

accessing, by the vehicle device, usage policy data that describes a usage policy of the mobile communication device during vehicle operation; and in response to determining by the vehicle device, based on the operational status of the vehicle and the operation being performed by the mobile communication device, that a usage policy violation has occurred, generating, by the vehicle device, policy violation data describing the usage policy violation.

11. The method of claim 10, further comprising wirelessly sending, by the vehicle device, the policy violation data to an administrator.

12. The method of claim 10, further comprising storing the policy violation data in a memory subsystem.

13. The method of claim 10, wherein the policy violation data include a location at where the usage policy violation occurred, and a time at which the usage policy violation occurred.

14. The method of claim 10, wherein the first wireless protocol is a personal area network protocol, and the second wireless protocol is a cellular network protocol.

15. The method of claim 10, wherein:
   the mobile communication device generates the operating data.

16. The method of claim 15, wherein the first wireless protocol is a personal area network protocol, and the second wireless protocol is a cellular network protocol.

17. The method of claim 16, wherein the generating the operating data describing the operation being performed by the mobile communication device over the second wireless protocol comprises anonmyzing the operation data so that personally identifiably information is excluded from the operating data.

* * * * *

UNITED STATES PATENT AND TRADEMARK OFFICE
CERTIFICATE OF CORRECTION

PATENT NO. : 8,712,628 B1  
APPLICATION NO. : 13/248685  
DATED : April 29, 2014  
INVENTOR(S) : Paul Hart It is certified that error appears in the above-identified patent and that said Letters Patent is hereby corrected as shown below:

In the Claims:

Claim 9, Column 12, Line 57 – delete "claim, 8" and insert -- claim 8, --, therefor.

Claim 9, Column 12, Line 60 – delete "anonmyzing" and insert -- anonymizing --, therefor.

Claim 17, Column 14, Line 18 – delete "anonmyzing" and insert -- anonymizing --, therefor.

Signed and Sealed this  
Twenty-sixth Day of August, 2014

Michelle K. Lee  
*Deputy Director of the United States Patent and Trademark Office*